United States Patent
Suwa et al.

(10) Patent No.: US 10,812,753 B2
(45) Date of Patent: Oct. 20, 2020

(54) DISPLAY DEVICE, TELEVISION RECEIVER, AND METHOD FOR MANUFACTURING STRUT

(71) Applicant: Sharp Kabushiki Kaisha, Sakai, Osaka (JP)

(72) Inventors: Kenichi Suwa, Sakai (JP); Yuki Amano, Sakai (JP); Hitoshi Hasegawa, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/751,474

(22) PCT Filed: Aug. 10, 2016

(86) PCT No.: PCT/JP2016/073616
§ 371 (c)(1),
(2) Date: Feb. 9, 2018

(87) PCT Pub. No.: WO2017/030071
PCT Pub. Date: Feb. 23, 2017

(65) Prior Publication Data
US 2018/0241963 A1    Aug. 23, 2018

(30) Foreign Application Priority Data
Aug. 19, 2015   (JP) ................. 2015-162179

(51) Int. Cl.
*H04N 5/64* (2006.01)
*G09F 9/00* (2006.01)
(Continued)

(52) U.S. Cl.
CPC ............ *H04N 5/64* (2013.01); *F16M 11/22* (2013.01); *F16M 13/005* (2013.01); *G09F 9/00* (2013.01);
(Continued)

(58) Field of Classification Search
CPC ............ F16M 2200/08; F16M 11/16; F16M 2200/028; G06F 1/1601; G06F 2200/1612;
(Continued)

(56) References Cited

U.S. PATENT DOCUMENTS 7,614,596 B2 * 11/2009 Takao ................... F16M 11/10
248/176.3
7,872,703 B2 * 1/2011 Maruta ................. F16M 11/10
349/58
(Continued)

FOREIGN PATENT DOCUMENTS

JP   S63-004516 A   1/1988
JP   2000-287784 A  10/2000
(Continued)

OTHER PUBLICATIONS

English translation of International Search Report of PCT/JP2016/0073616 Published Feb. 23, 2017.

*Primary Examiner* — Nathaniel Aynalem
(74) *Attorney, Agent, or Firm* — ScienBiziP, P.C.

(57) ABSTRACT

A display device is a display device 1 that includes a display unit main body that displays a video, two struts each of which has one end installed in the display unit main body, and a base on which both of the other ends of the two struts are installed, and includes a reversed installation prevention unit that prevents the two struts from being reversely installed in the display unit main body and the base, in which the two struts are formed by folding metal plates, which have the same shape, in opposite directions with respect to front and back sides and providing column shapes having different shapes with fold line directions as longitudinal directions.

5 Claims, 18 Drawing Sheets

(51) Int. Cl.
 *F16M 13/00* (2006.01)
 *F16M 11/22* (2006.01)
 *H04N 5/655* (2006.01)
 *F16M 11/00* (2006.01)

(52) U.S. Cl.
 CPC ............. *H04N 5/655* (2013.01); *F16M 11/00* (2013.01); *F16M 2200/08* (2013.01)

(58) Field of Classification Search
 CPC ... Y10S 248/917; Y10S 345/905; H04N 5/64; A47B 2097/005
 USPC ................. 248/188.8, 917–924; 361/679.21; 348/836
 See application file for complete search history.

(56) References Cited

U.S. PATENT DOCUMENTS

| | | | | |
|---|---|---|---|---|
| 8,422,221 B2* | 4/2013 | Perez | ..................... | F16M 11/10 248/371 |
| 8,490,931 B2* | 7/2013 | Takao | ..................... | F16M 11/22 108/150 |
| 8,740,169 B2* | 6/2014 | Sawai | ................. | F16M 11/2014 248/346.01 |
| 2003/0103092 A1* | 6/2003 | Byoun | .................... | F16M 11/22 715/866 |
| 2005/0050784 A1* | 3/2005 | Bang | ...................... | F16M 11/22 40/607.01 |
| 2006/0208145 A1* | 9/2006 | Chen | .................... | F16M 11/046 248/289.11 |
| 2006/0290832 A1* | 12/2006 | Lin | ........................ | F16M 11/10 349/58 |
| 2007/0047188 A1* | 3/2007 | Kim | ........................ | F16M 11/22 361/679.22 |
| 2007/0090233 A1* | 4/2007 | Choi | ..................... | F16M 11/10 248/122.1 |
| 2009/0095870 A1* | 4/2009 | Chang | .................... | F16M 11/22 248/440 |

FOREIGN PATENT DOCUMENTS

| | | |
|---|---|---|
| JP | 2007-310318 A | 11/2007 |
| JP | 2011-064798 A | 3/2011 |
| JP | 2013-85112 A | 5/2013 |
| JP | 2015-018184 A | 1/2015 |
| WO | WO-2008072306 A1 * | 6/2008 ............. F16M 11/24 |

\* cited by examiner

DISPLAY DEVICE, TELEVISION RECEIVER, AND METHOD FOR MANUFACTURING STRUT

CROSS-REFERENCE TO RELATED APPLICATIONS

This application is the national phase under 35 U. S. C. § 371 of PCT International Application No. PCT/JP2016/073616 which has an International filing date of Aug. 10, 2016 and designated the United States of America.

FIELD

The present invention relates to a display device supported by a stand, a television receiver, and a method for manufacturing a strut included in the stand.

BACKGROUND

A thin display device such as a liquid crystal display is difficult to be kept at an upright state only by a display unit main body, and is thus installed being supported by a stand in many cases. The stand has a base placed on a plane and a strut installed on the base. The display unit main body and the stand are not assembled at a time of product shipment of the display device, and when a user installs the strut in the display unit main body, the display unit main body and the stand are assembled.

When the strut is installed in an erroneous installation manner, there is a case where the front and rear of the stand are reversed with respect to the display unit main body. In such a case, there is a possibility that the display device has unstable center of gravity and falls, for example. In order to prevent the reversed installation of the strut as described above, Japanese Unexamined Patent Application Publication No. 2007-310318 discloses a display device in which protrusions are formed at an upper end of a strut and, at an opening formed on a lower surface of a display unit main body, notches are processed so that the opening has almost the same shape as a shape of the upper end of the strut. According to the invention of Japanese Unexamined Patent Application. Publication No. 2007-310318, even when the strut is to be erroneously inserted into the opening in a reverse direction, it is difficult for the strut to be inserted into the opening unless the protrusions and the notches are matched in positions, thus making it possible to prevent reversed installation of the strut.

In a case where a display device has a large size, in order to support the large-sized display device stably, the number of struts is not set as one, but a plural number, in particular, two in many cases. In this case, a stand has a common base and two struts which are installed on the base. In Japanese Unexamined Patent Application Publication No. 2007-310318, the number of struts included in a stand is one and a stand that has two struts is not disclosed. In a case where the stand has two struts and each of the struts is also subjected to processing for preventing reversed installation in a similar manner to the invention according to Japanese Unexamined Patent Application Publication No. 2007-310318, the processing needs to be applied separately at manufacturing steps of the struts, resulting in an increase in the number of steps.

It is an object to provide a display device capable of preventing, even when a stand has two struts, reversed installation of each of the struts while suppressing an increase in the number of steps, a television receiver, and a method for manufacturing the strut.

SUMMARY

A display device according to an aspect of the present disclosure includes a display unit main body that displays a video, two struts each of which has one end installed in the display unit main body, and a base on which both of the other ends of the two struts are installed, and the display device includes a reversed installation prevention unit that prevents the two struts from being reversely installed in the display unit main body and the base, in which the two struts are formed by folding metal plates, which have the same shape, in opposite directions with respect to front and back sides and providing column shapes having different shapes with fold line directions as longitudinal directions.

In the display device according to another aspect of the present disclosure, each of the two struts has the other end in which strut-side insertion holes provided at asymmetrical positions with respect to a central axis are provided, the base has base-side insertion holes, which are provided at positions corresponding to the strut-side insertion holes, at an installation part of each of the two struts, and the reversed installation prevention unit is a connecting unit that connects the two struts and the base with screws inserted into the strut-side insertion holes and the base-side insertion holes.

In the display device according to another aspect of the present disclosure, each of the two struts has the other end in which a protrusion or a through hole is provided, the base has a through hole or a protrusion, each of which is provided at a position corresponding to the protrusion or the through hole, at an installation part of each of the two struts, and the reversed installation prevention unit is a passing unit in which the protrusion passes through the through hole.

In the display device according to another aspect of the present disclosure, each of the two struts has a sectional shape in a U-shape and has the one end provided with a notch that extends along one edge on an opening side of a cross section, the display unit main body has a claw, which is provided at a position corresponding to the notch, at an installation part of each of the two struts, and the reversed installation prevention unit is an engagement unit in which the notch and the claw are engaged.

A television receiver according to another aspect of the present disclosure includes the display device according to any of the above, and a reception unit that receives television broadcasting, in which the display device is set to display a video on a basis of the television broadcasting received by the reception unit.

A method for manufacturing a strut according to another aspect of the present disclosure is a method for manufacturing a strut, by which two struts that are installed in a display unit main body of a display device and have shapes different from each other are manufactured, and the method includes folding metal plates, which have the same shape, in opposite directions with respect to front and back sides and forming the metal plates into column shapes having different shapes with fold line directions as longitudinal directions.

According to an aspect of the present disclosure, even when a stand has two struts, it is possible to prevent reversed installation of each of the struts while suppressing an increase in the number of steps.

DETAILED DESCRIPTION

Hereinafter, the present disclosure will be described in detail with reference to drawings illustrating embodiments of the disclosure. Description will be given below with use of a display device according to a television receiver as an example.

Embodiment 1

Figure 1:
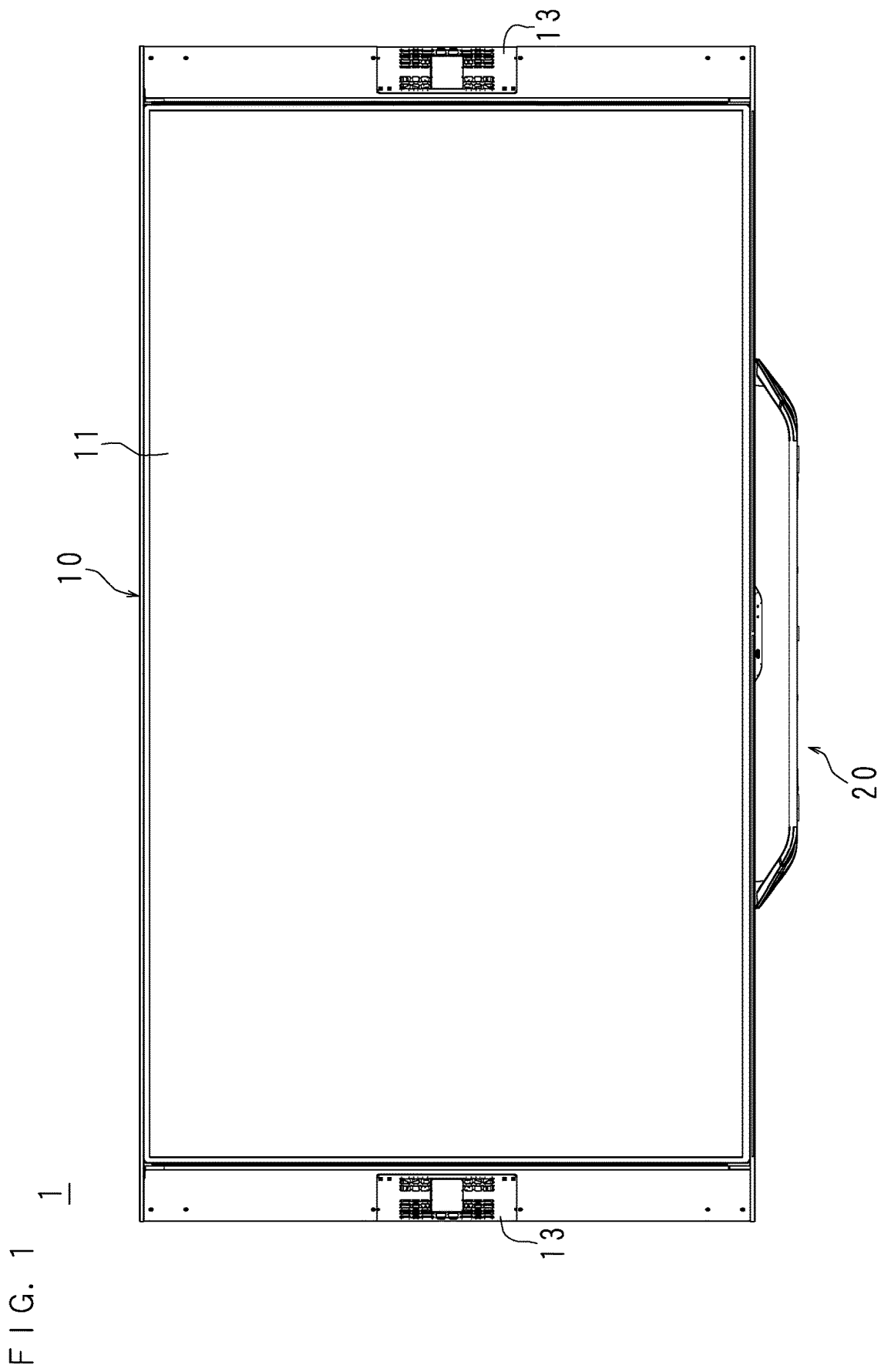
FIG. 1 is a front view of a display device.
Figure 2:
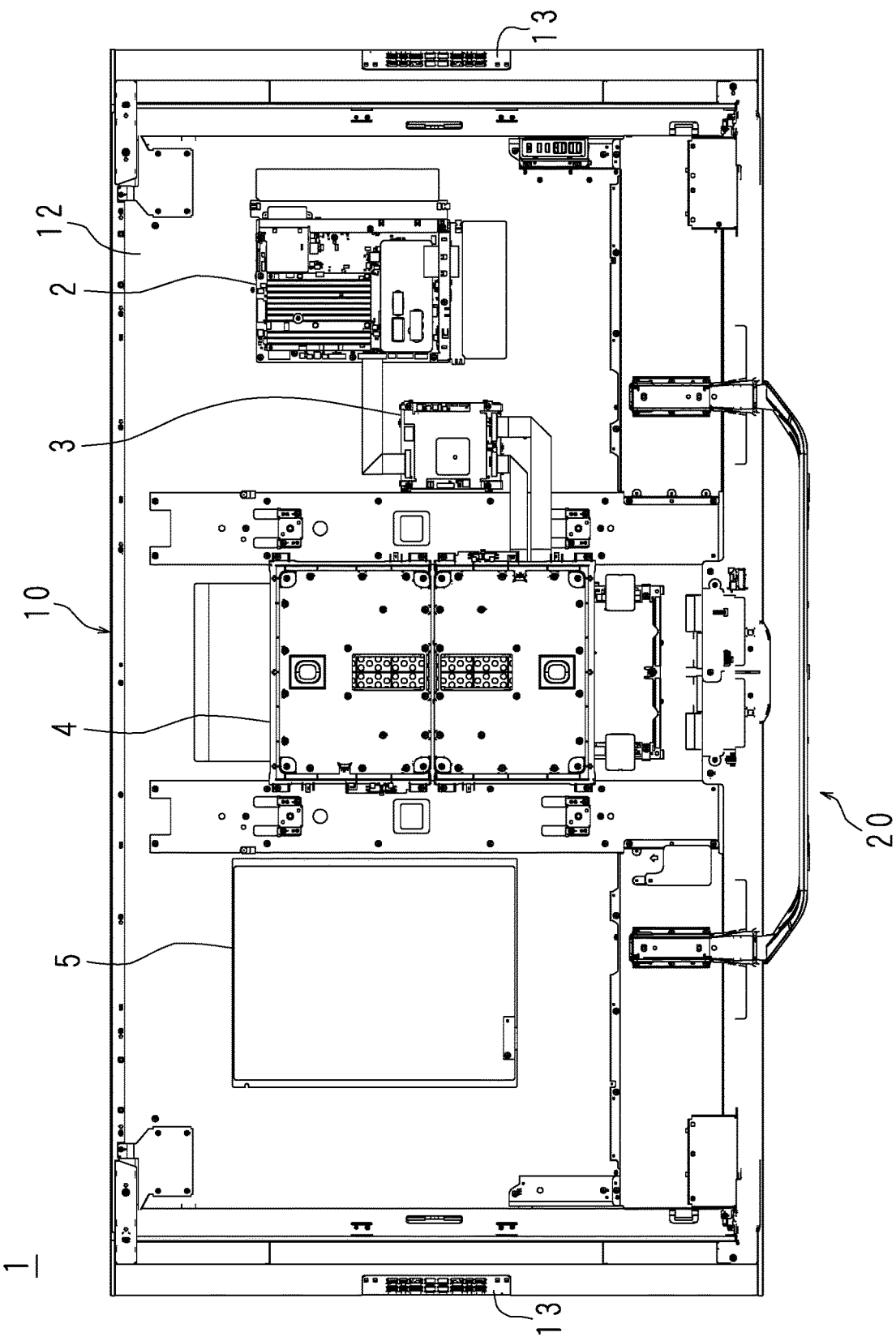
FIG. 2 is a rear view of the display device.

FIG. 1 is a front view of a display device 1. FIG. 2 is a rear view of the display device 1. The display device 1 includes a display unit main body 10 that displays a video, and a stand 20 that is installed in the display unit main body 10 and supports the display unit main body 10. Here, a side on which the display unit main body 10 displays a video is assumed as a front side and a side opposite thereto is assumed as a rear side. The right and left when the display unit main body 10 is viewed from the front side are assumed as the right and left of the display device 1. Moreover, a side on which the stand 20 is installed is assumed as a lower side and a side opposite thereto is assumed as an upper side. FIG. 1 illustrates the display device 1 when viewed from the front side. FIG. 2 illustrates the display device 1 when viewed from the rear side.

The display unit main body 10 is a display unit in a rectangular shape being thin in a front-rear direction, and has a display panel 11 on a front surface thereof, a housing 12 on a rear surface thereof, and a speaker 13 on each side part thereof. The display unit main body 10 displays a video on the display panel 11.

The housing 12 is a housing in a rectangular shape covering the rear surface of the display panel 11, and is a metal forming, for example. On a rear surface of the housing 12, a reception unit 2, a signal processing unit 3, a panel driving circuit 4, and a power supply circuit 5 are installed.

The reception unit 2 receives television broadcasting. The signal processing unit 3 generates a video signal on the basis of the television broadcasting received by the reception unit 2. The panel driving circuit 4 drives the display panel 11 on the basis of the video signal generated by the signal processing unit 3. The power supply circuit 5 supplies power to each of the units of the display unit main body 10. The speaker 13 outputs sound on the basis of the television broadcasting received by the reception unit 2.

Figure 3:
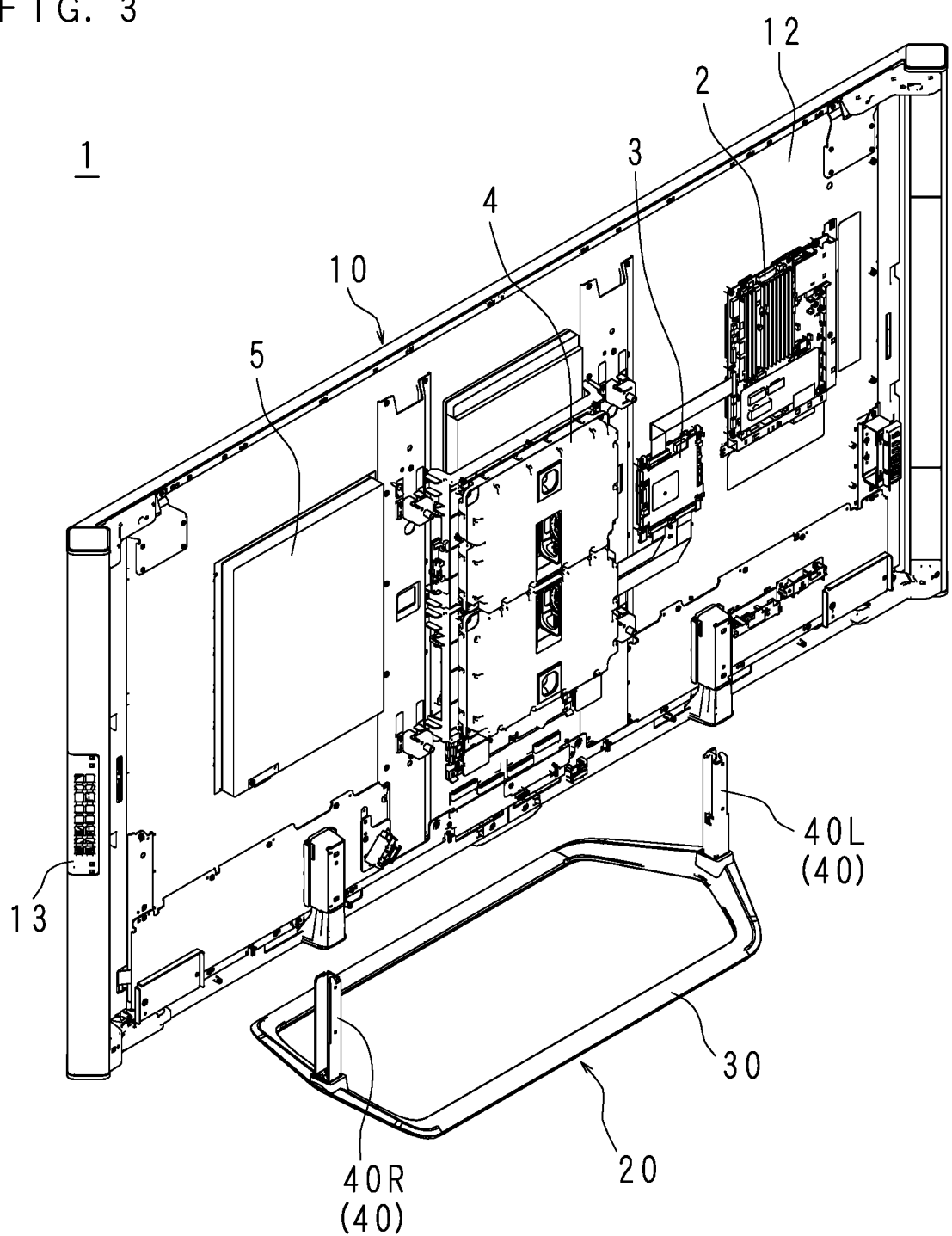
FIG. 3 is an external view of a display unit main body and a stand.
Figure 4:
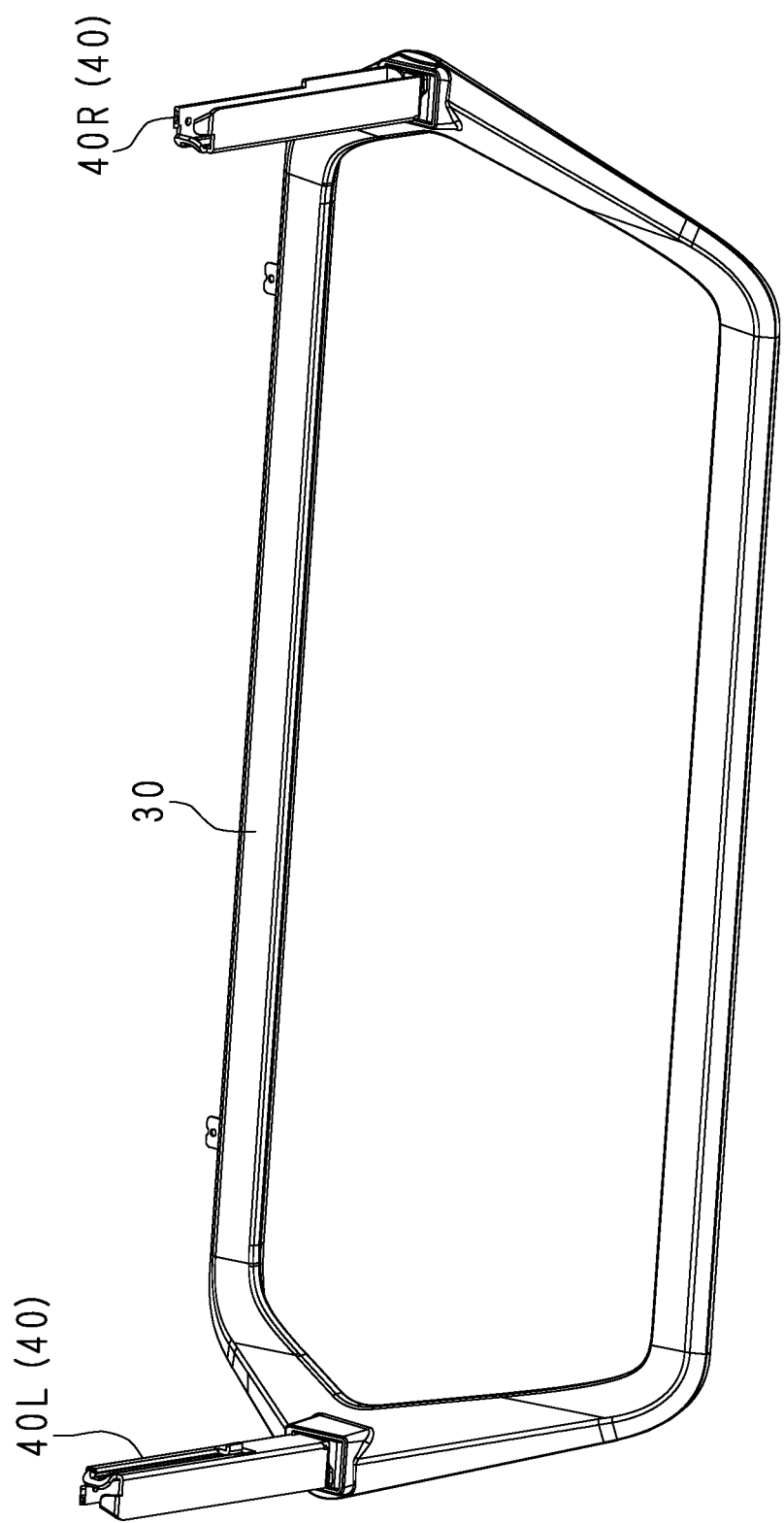
FIG. 4 is a perspective view of the stand.

FIG. 3 is an external view of the display unit main body 10 and the stand 20, FIG. 4 is a perspective view of the stand 20. FIG. 3 illustrates a state where the stand 20 is detached from the display unit main body 10. FIG. 4 illustrates the stand 20 when viewed diagonally from a right front side.

The stand 20 includes a base 30, a first strut 40R, and a second strut 40L. As illustrated in FIGS. 3 and 4, the base 30 according to the present embodiment has a ring shape. More specifically, the base 30 is a horizontally long hexagonal frame in a plan view and has a ship bottom shape in a front view and a rear view. Note that, the shape of the base 30 according to the present embodiment is able to be changed to another shape and may be a flat plate shape, for example. The base 30 is formed, for example, by covering a metal frame part with a resin member.

As illustrated in FIGS. 3 and 4, on a right end part and a left end part of the base 30, a lower end part of the first strut 40R and a lower end part of the second strut 40L are respectively installed so that longitudinal directions thereof face upward. The first strut 40R and the second strut 40L are metal formings. Metal plates having the same shape are folded in opposite directions with respect to front and back sides, so that the first strut 40R and the second strut 40L are formed in column shapes having different shapes with fold line directions as longitudinal directions, and details thereof will be described later. Each of the first strut 40R and the second strut 40L is a columnar body whose sectional shape is a U-shape. As illustrated in FIG. 4, the first strut 40R and the second strut 40L are installed on the base 30 so that opening surfaces of U-shaped sectional surfaces respectively face right and left outer sides of the display device 1. The first strut 40R and the second strut 40L according to the present embodiment have shapes which are bilaterally symmetrical to each other. Hereinafter, the first strut 40R and the second strut 40L are collectively referred to also as struts 40 as appropriate.

Note that, the first strut 40R and the second strut 40L do not need to be always bilaterally symmetrical to each other and are only required to have shapes different from each other.

As illustrated in FIG. 2, the struts 40 are installed on the rear surface of the housing 12. Thereby, the stand 20 supports the display unit main body 10. Note that, a place where the struts 40 are installed is not limited to the rear surface of the housing 12 and the struts 40 may be installed, for example, on the side parts of the display unit main body 10.

Figure 5:
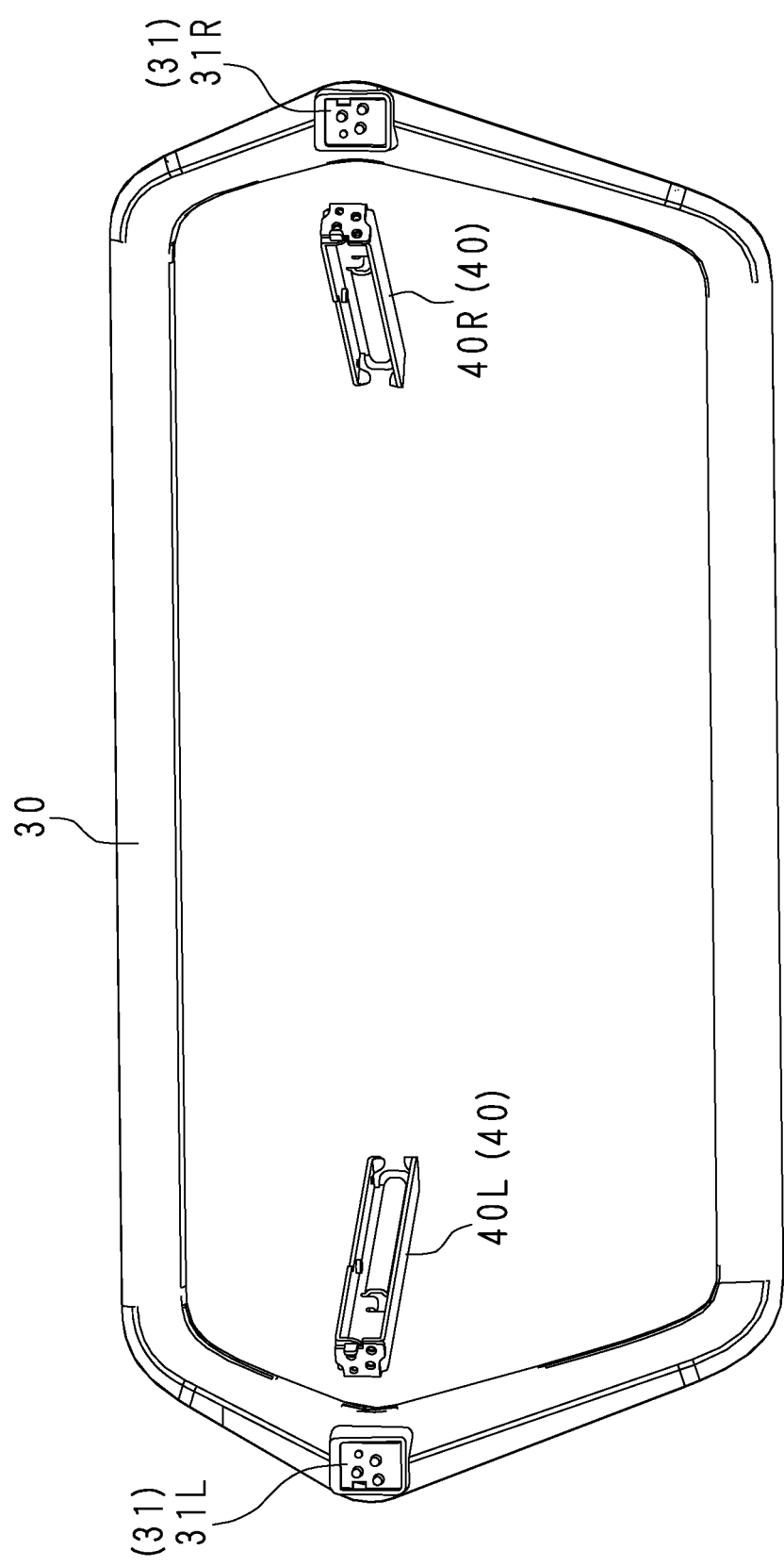
FIG. 5 is an external view illustrating an installation structure of a base and each of struts.
Figure 6:
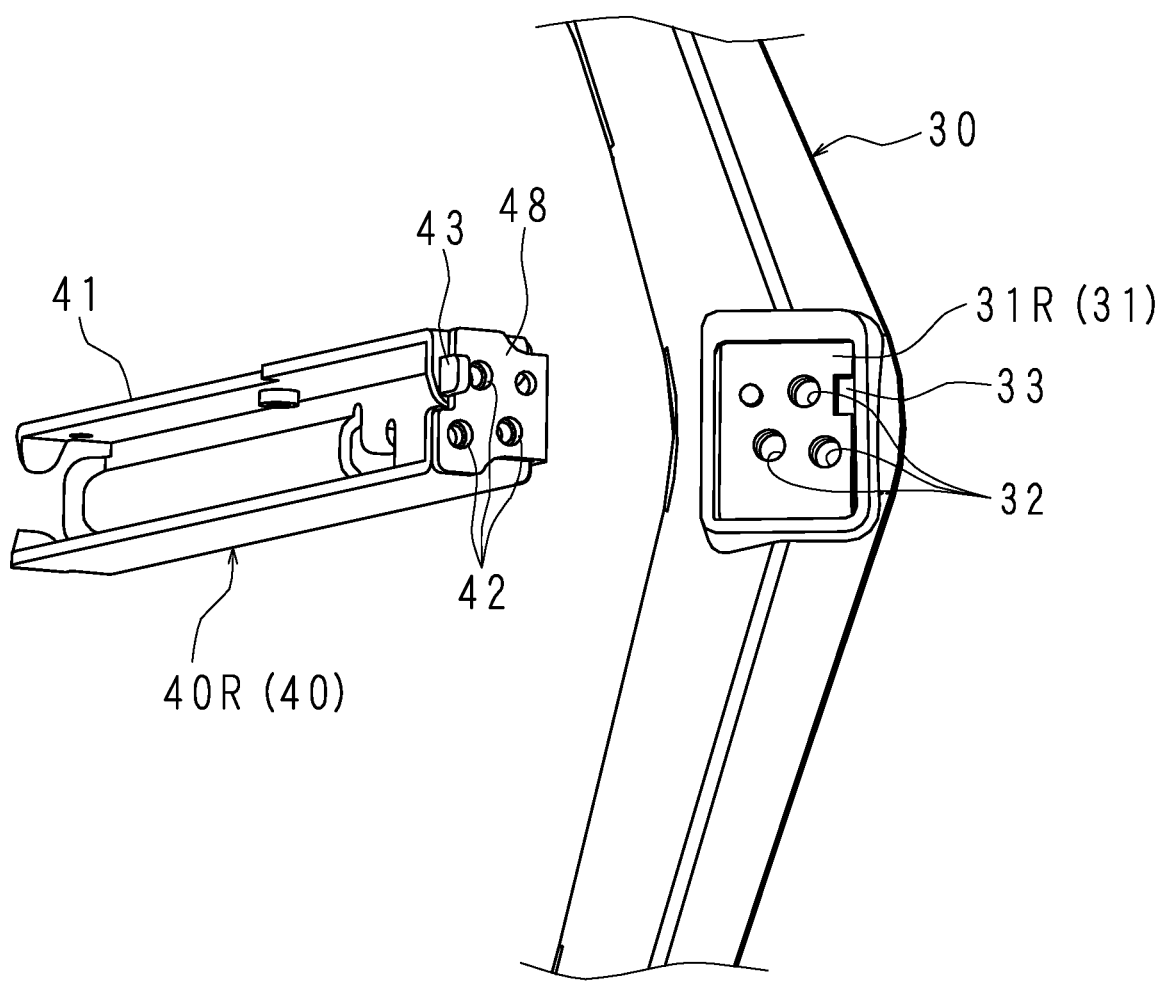
FIG. 6 is a partial enlarged view illustrating the installation structure of the base and the strut.
Figure 7:
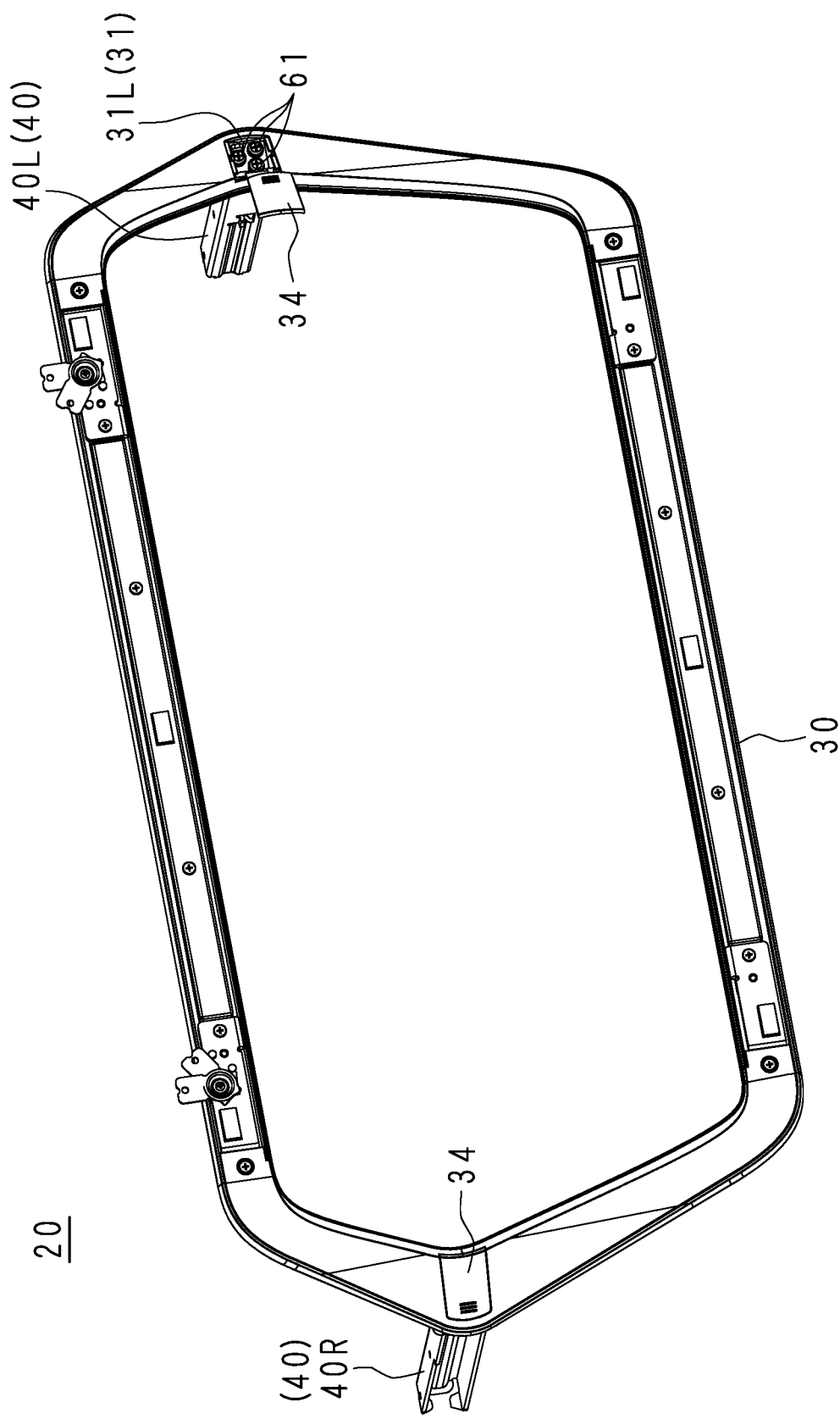
FIG. 7 is a bottom perspective view of the stand.
Figure 8:
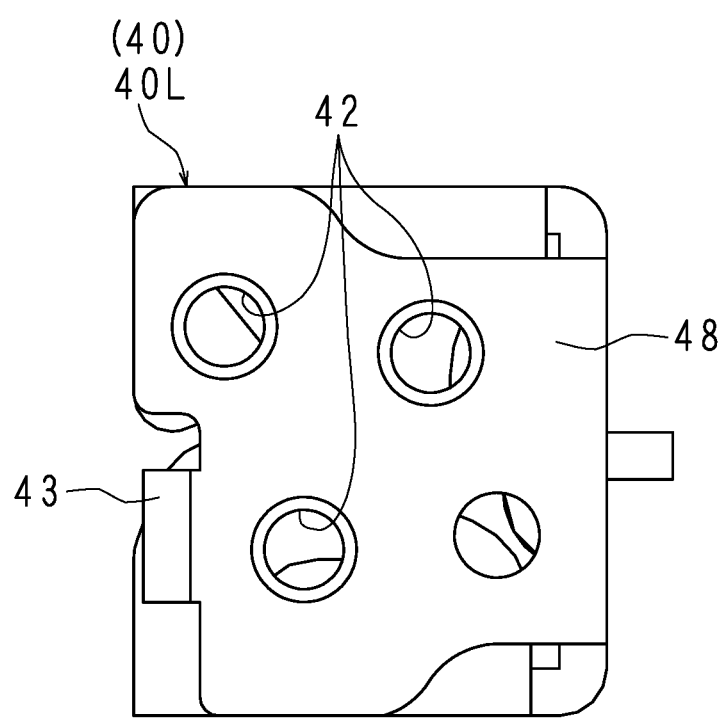
FIG. 8 is a bottom view of the strut.

FIG. 5 is an external view illustrating an installation structure of the base 30 and each of the struts 40. FIG. 6 is a partial enlarged view illustrating the installation structure of the base 30 and the strut 40. FIG. 7 is a bottom perspective view of the stand 20. FIG. 8 is a bottom view of the strut 40. FIG. 5 illustrates a state where the struts 40 are detached from the base 30. FIG. 6 illustrates an enlarged periphery of the right end part of the base 30 in FIG. 5. FIG. 7 illustrates the stand 20 when viewed diagonally from a lower right side. FIG. 8 illustrates the second strut 40L when viewed from a lower side.

The installation structure of the base 30 and the struts 40 will be described with reference to FIGS. 5 to 8.

As illustrated in FIG. 5, a first recessed part 31R and a second recessed part 31L which have rectangular shapes in a plan view are respectively formed at corner portions of the hexagon, which are positioned at both the right and left end parts of the base 30. Each of the first recessed part 31R and the second recessed part 31L is a recessed that has a rectangular shape and is recessed downwardly. The shapes of the first recessed part 31R and the second recessed part 31L respectively correspond to shapes of the lower end parts of the first strut 40R and the second strut 40L, and the lower end parts of the first strut 40R and the second strut 40L are respectively inserted into the first recessed part 31R and the second recessed part 31L. In the present embodiment, correspondingly to the first strut 40R and the second strut 40L having the shapes which are bilaterally symmetrical to each other, the first recessed part 31R and the second recessed part 31L also have shapes which are bilaterally symmetrical to each other. Hereinafter, the first recessed part 31R and the second recessed part 31L are collectively referred to as recessed parts 31 as appropriate.

As illustrated in FIG. 6, each of the struts 40 has a bottom surface 48 in a rectangular shape. On the bottom surface 48, bottom insertion holes 42 and a protrusion 43 are formed. The bottom insertion holes 42 are formed at asymmetrical positions with respect to a central axis of the strut 40, and three bottom insertion holes 42 are formed on the bottom surface 48 in the present embodiment as illustrated in FIGS. 6 and 8. Note that, the number of the bottom insertion holes 42 is not limited to three as long as the bottom insertion holes 42 are formed at asymmetrical positions with respect to the central axis of the strut 40. The protrusion 43 is provided so as to protrude downwardly from the lower end part of the strut 40, for example.

Each of the struts 40 also has a notch 41 that extends along an edge on an opening side. The notch 41 will be described later.

As illustrated in FIG. 6, base-side insertion holes 32 and a through hole 33 are formed on a rectangular bottom surface of each of the recessed parts 31. Three base-side insertion holes 32 are provided at positions corresponding to the bottom insertion holes 42 of the strut 40. Note that, similarly to the bottom insertion holes 42, the number of the base-side insertion holes 32 is not limited to three in the present embodiment. In a case where the lower end part of the strut 40 is inserted into the recessed part 31, the bottom insertion holes 42 match the base-side insertion holes 32. The through hole 33 is a hole provided in a part of the rectangular bottom surface of the recessed part 31. The through hole 33 is provided at a position corresponding to the protrusion 43 of the strut 40, and when the lower end part of the strut 40 is inserted into the recessed part 31, the protrusion 43 passes through the through hole 33.

As described above, when the lower end part of the strut 40 is inserted into the recessed part 31, the bottom insertion holes 42 match the base-side insertion holes 32. Accordingly, screws 61 are able to be inserted into the bottom insertion holes 42 and the base-side insertion holes 32. As illustrated in FIG. 7, the screws 61 are inserted into the bottom insertion holes 42 and the base-side insertion holes 32 from a lower side of the base 30. Thereby, the base 30 and the strut 40 are connected. Note that, as illustrated in FIG. 7, each of the recessed parts 31 exposed from a bottom surface of the base 30 is covered with a cover 34 made of resin.

Figure 9:
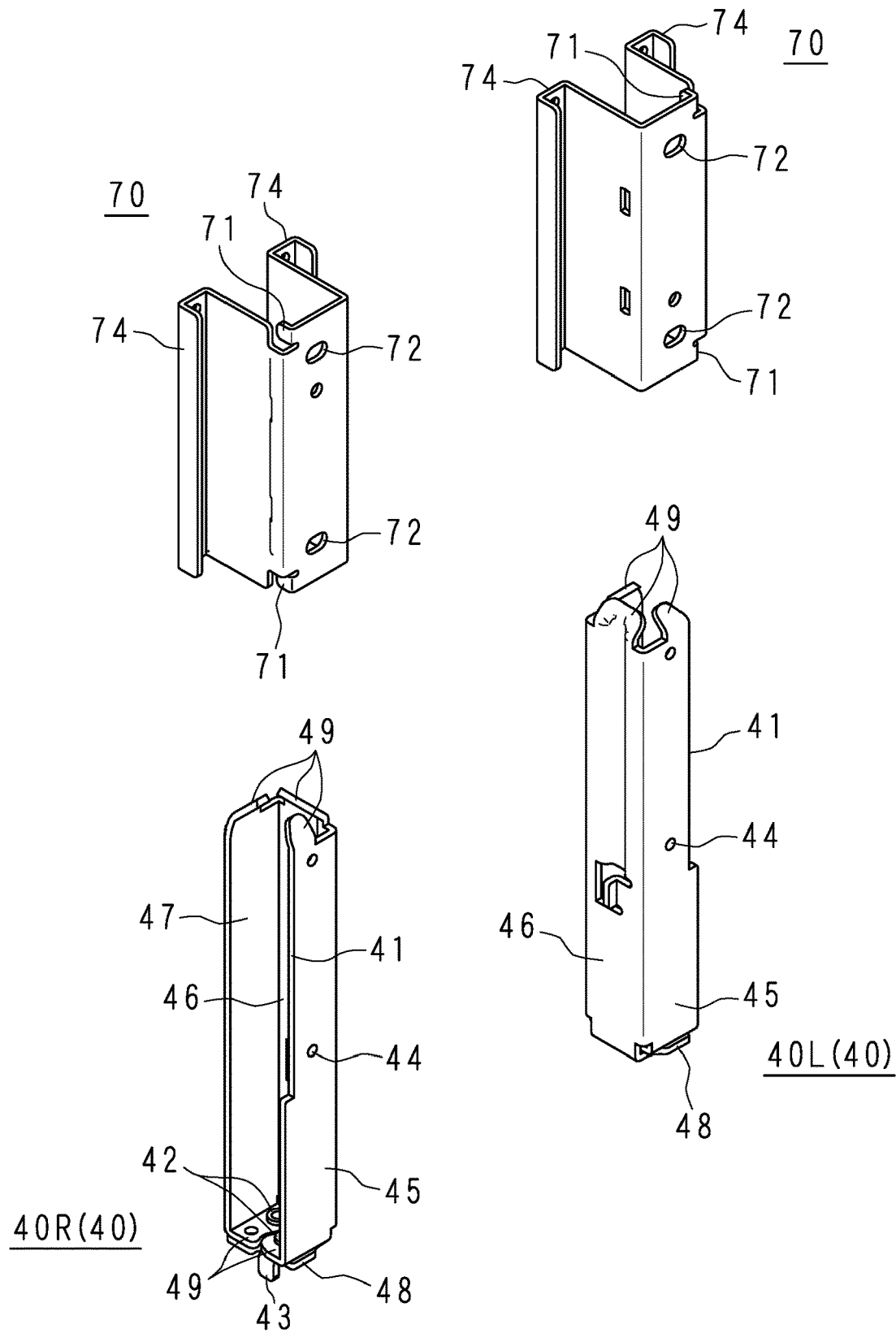
FIG. 9 is an external view of each of the struts and each of fixing metal fittings.
Figure 10:
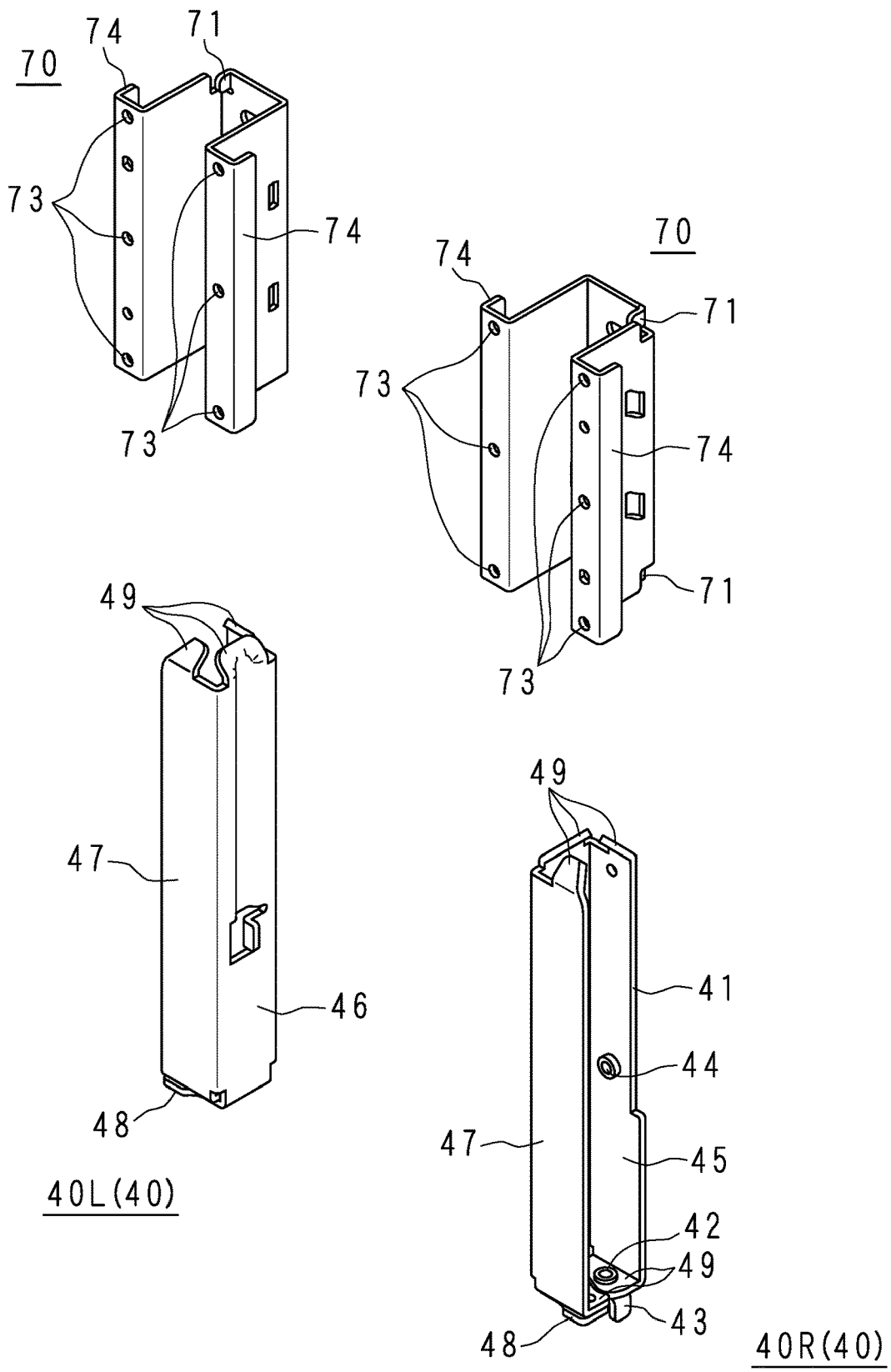
FIG. 10 is an external view of each of the struts and each of the fixing metal fittings.
Figure 11:
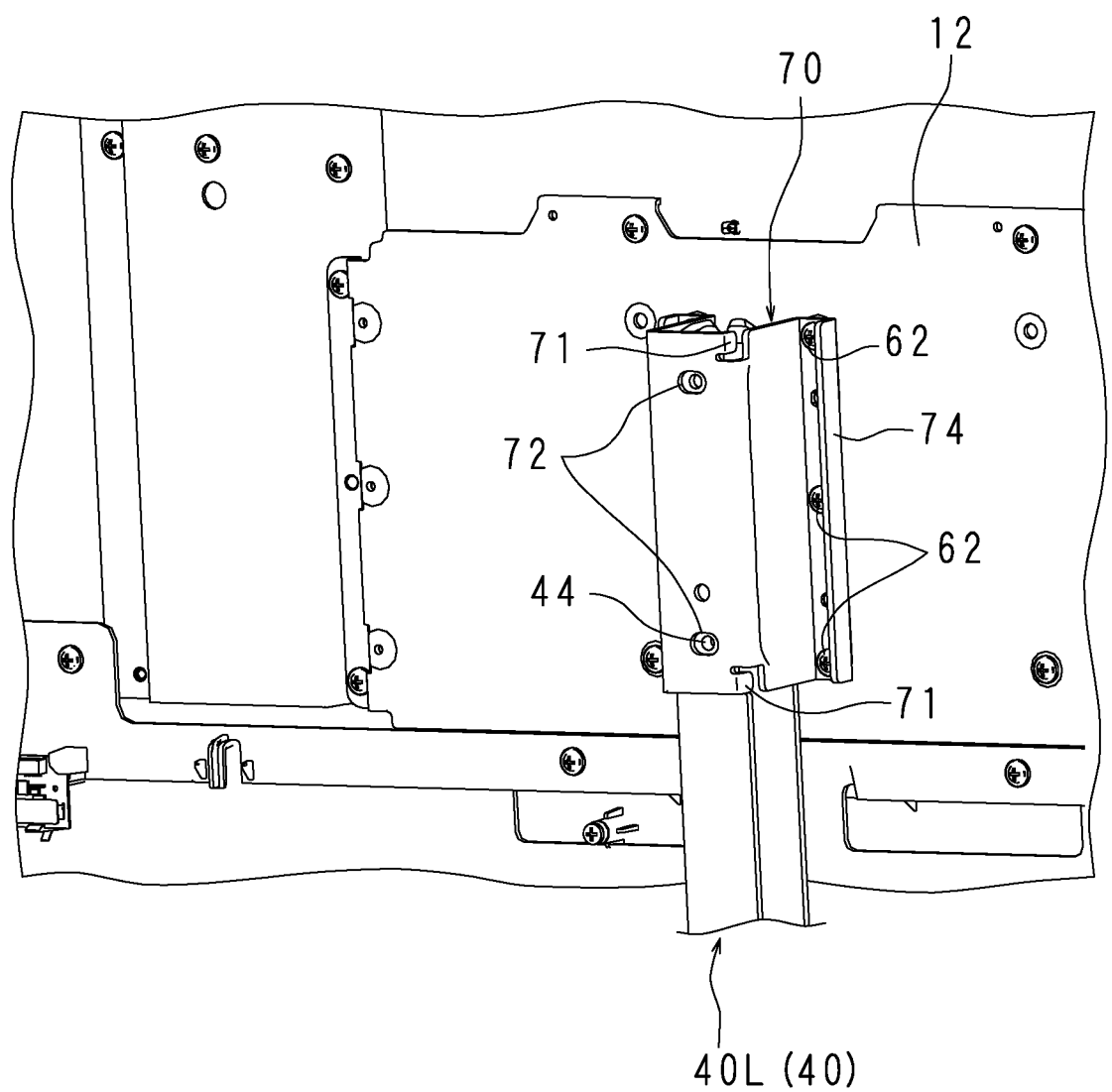
FIG. 11 is a partial enlarged view illustrating an installation structure of the display unit main body and the strut.
Figure 12:
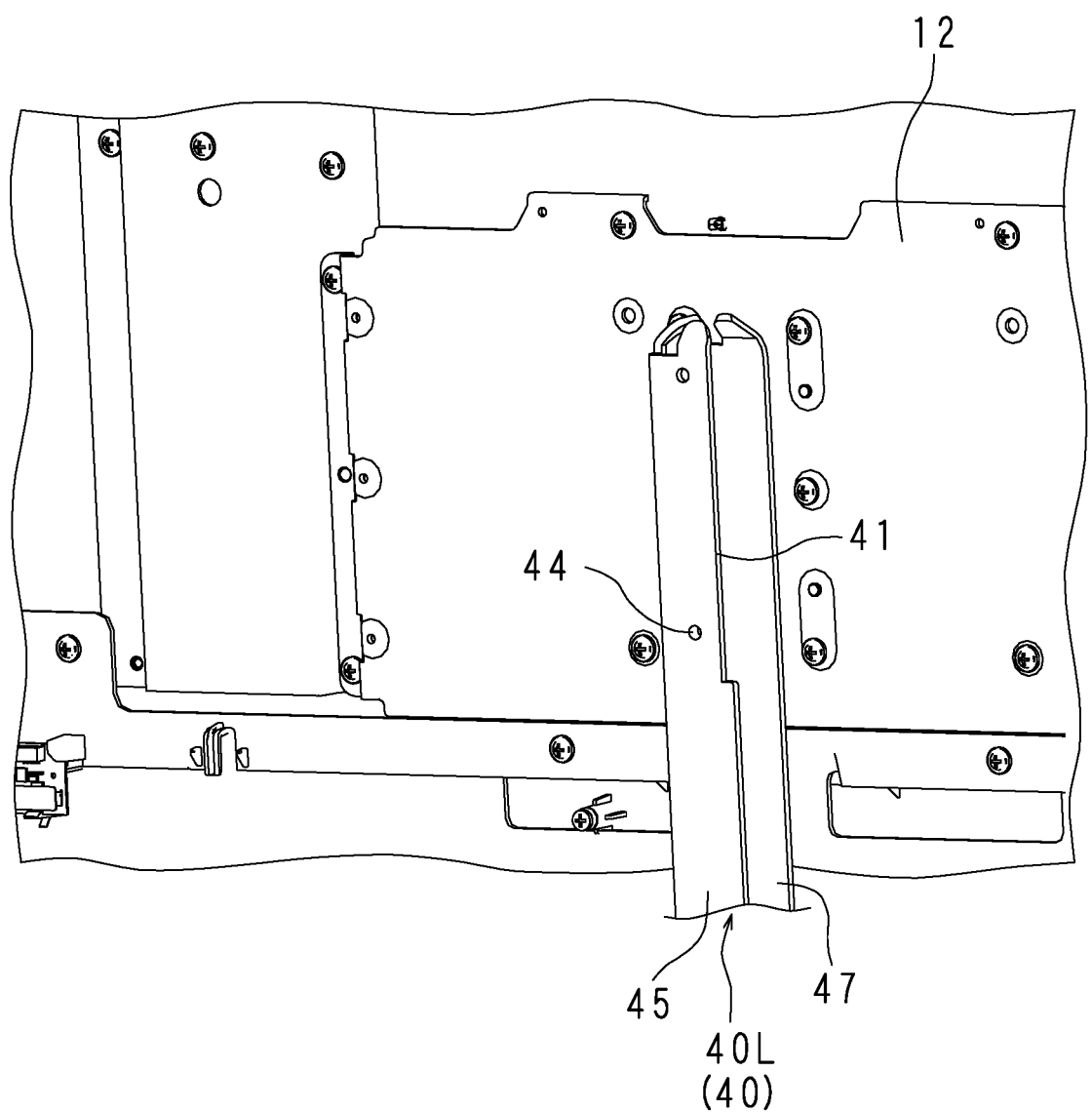
FIG. 12 is a partial enlarged view illustrating a state where the fixing metal fitting is removed from the installation structure of the display unit main body and the strut.

FIGS. 9 and 10 are external views of each of the struts 40 and each of fixing metal fittings 70. FIG. 11 is a partial enlarged view illustrating an installation structure of the display unit main body 10 and the strut 40. FIG. 12 is a partial enlarged view illustrating a state where the fixing metal fitting 70 is removed from the installation structure of the display unit main body 10 and the strut 40. Appearances of the first strut 40R, the second strut 40L, and the fixing metal fittings 70 and 70 are indicated from different angles between FIGS. 9 and 10. FIG. 11 illustrates a state where the first strut 40R is installed in the housing 12, which is viewed diagonally from a left rear side. FIG. 12 illustrates a state where the fixing metal fitting 70 is removed from the state of FIG. 11.

The installation structure of the struts 40 and the display unit main body 10 will be described with reference to FIGS. 9 to 11.

As illustrated in FIGS. 9 and 10, each of the struts 40 is the columnar body whose sectional shape is the U-shape and has the bottom insertion holes 42 and the protrusion 43 on the bottom surface 48, as described above. Here, for convenience of description, among three side surfaces of the strut 40 in the U-shape, a side surface facing the rear side of the display device 1, a side surface facing the right and left inner sides, and a side surface facing the front side when the strut 40 is installed in the display unit main body 10 are respectively referred to as a rear side surface 45, an inner side surface 46, and a front side surface 47. The notch 41 that is provided along the longitudinal direction and a side part insertion hole 44 are formed on the rear side surface 45. The strut 40 has a plurality of tongue pieces 49 at an upper end part and the lower end part thereof.

The notch 41 is formed at the upper end part of the strut 40 along one edge on the opening side of the cross section in the U-shape. More specifically, the notch 41 is formed by removing the edge on the opening side of the rear side surface 45 with a fixed width and by a certain length from the upper end along the longitudinal direction.

The side part insertion hole 44 is a screw hole provided on the rear side surface 45 of the strut 40. The side part insertion hole 44 is provided slightly above a lower end of a range where the notch 41 is formed.

The fixing metal fitting 70 is formed by folding a metal plate, for example. The fixing metal fitting 70 extends vertically and has a cross section in a U-shape. A length of the fixing metal fitting 70 in the longitudinal direction is almost the same as a length of the notch 41 of the strut 40. An opening surface of the fixing metal fitting 70 faces the front side of the display device 1. Side edge parts 74 each of which has an L-shape in a plan view are provided on the right and left to extend outwardly from right and left opening edges of the fixing metal fitting 70 that is opened in a U-shape. The fixing metal fitting 70 has two claws 71, two rear surface insertion holes 72, and a plurality of side edge insertion holes 73.

On a rear surface of the fixing metal fitting 70, which corresponds to a bottom in the U-shape, each of the claws 71 is provided at a position corresponding to the notch 41 of the strut 40. More specifically, the claws 71 are provided at upper and lower end parts of one long side positioned on a right or left outer side of the display device 1 among two long sides formed by the rear surface of the fixing metal fitting 70. Each of the claws 71 has a shape obtained by forming the upper or lower end part into a hinge shape and folding the resultant inside the U-shaped opening of the fixing metal fitting 70.

The rear surface insertion holes 72 are provided on the rear surface of the fixing metal fitting 70. A position at which one of the rear surface insertion holes 72 is provided corresponds to the position of the side part insertion hole 44 provided on the rear side surface 45 of the strut 40. The two rear surface insertion holes 72 are provided at positions vertically symmetrical to each other on the rear surface of the fixing metal fitting 70.

The side edge insertion holes 73 are provided on one side surface parallel to the rear surface of the fixing metal fitting 70 among side surfaces formed by the side edge part 74. A plurality of side edge insertion holes 73 are formed in a longitudinal direction of the one side surface.

Since the fixing metal fitting 70 has the shape as described above, when the fixing metal fitting 70 is turned upside down, a bilaterally symmetrical shape is obtained. Thus, as illustrated in FIGS. 9 and 10, the fixing metal fittings 70 and 70 that respectively fix the first strut 40R and the second strut 40L are the same metal fittings. When the fixing metal fittings 70 are used in an upside down manner with respect to each other for the first strut 40R and the second strut 40L which are bilaterally symmetrical, the first strut 40R and the second strut 40L are able to be fixed by the same fixing metal fittings 70.

When screws 62 are inserted into the side edge insertion holes 73, the fixing metal fitting 70 is installed in the housing 12. FIG. 11 illustrates a state where the strut 40 is inserted from the lower side into the opening part of the fixing metal fitting 70 installed in the housing 12. Note that, the tongue pieces 49 formed inn the upper end part of the strut 40 function as a guide when the strut 40 is inserted into the opening part of the fixing metal fitting 70. As illustrated in FIG. 12, the front side surface 47 abuts against a panel chassis 12 while the strut 40 is being inserted. As illustrated in FIG. 11, when the claw 71 positioned on a lower end of the rear surface of the fixing metal fitting 70 abuts against a lower corner of the notch 41, the strut 40 is positioned. In the positioned state, the side part insertion hole 44 and one of the rear surface insertion holes 72 match. The rear surface of the display device 1 in the state of FIG. 11 is covered with a not-illustrated rear cabinet, and a screw is inserted into the side part insertion hole 44 and the rear surface insertion hole 72 through insertion holes provided on the rear cabinet, so that the strut 40 is fixed. As a result, the strut 40 is installed in the display unit main body 10.

Figure 13A:
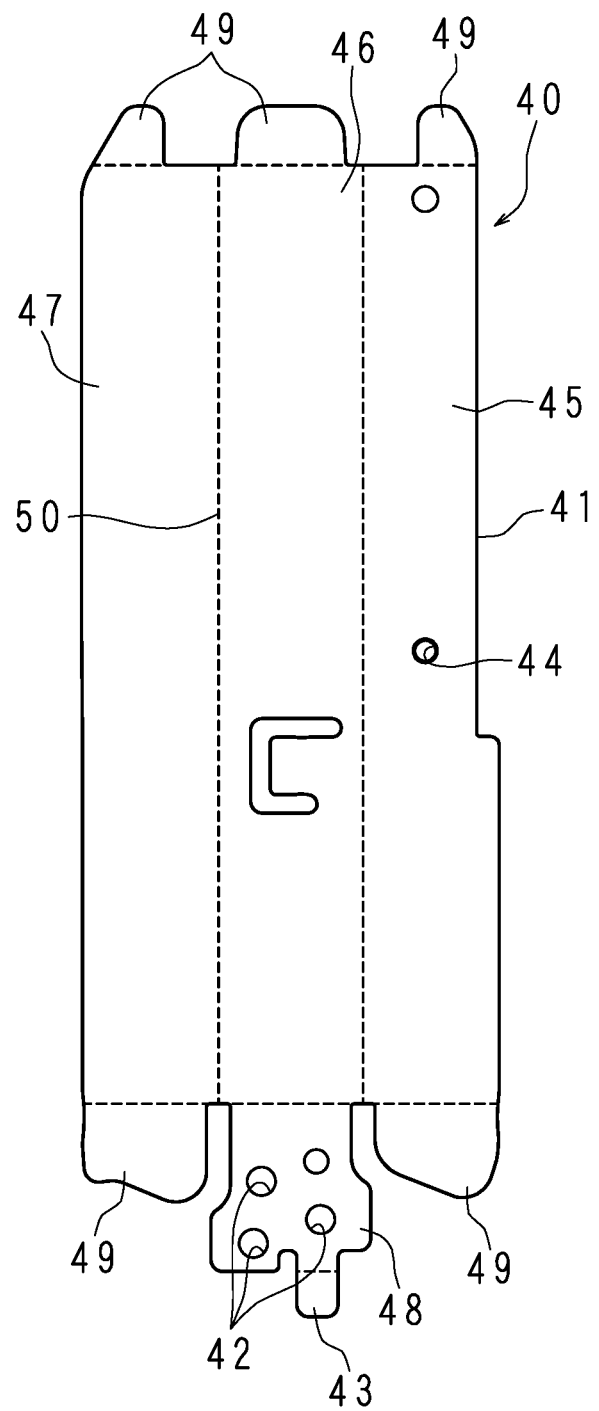
FIG. 13A is a development view of the strut.
Figure 13B:
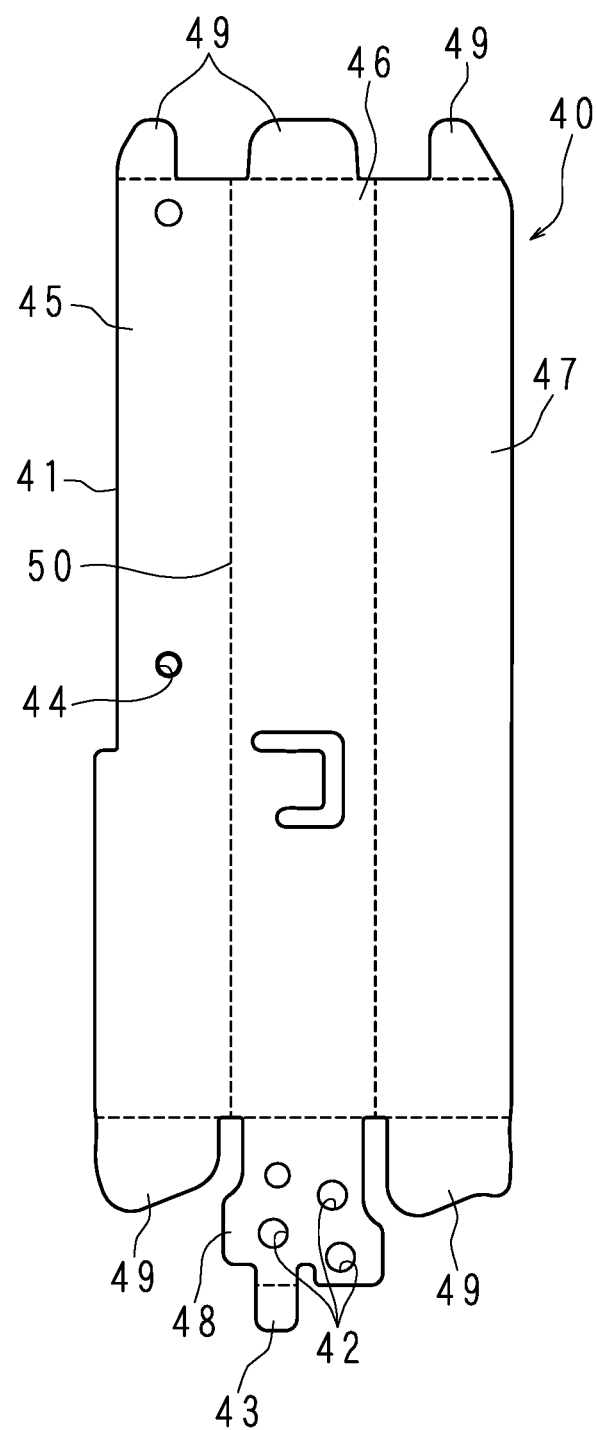
FIG. 13B is a development view of the strut.

FIGS. 13A and 13B is a development view of the strut 40. The strut 40 is formed by folding a metal plate illustrated in FIGS. 13A and 13B. A vertical direction in FIGS. 13A and 13B corresponds to a vertical direction of the strut 40 after folding processing. FIGS. 13A and 13B illustrate metal plates with front and rear sides opposed to each other. A reference sign 50 is used to denote a fold line and each of the metal plates is folded along the fold line 50. A method for manufacturing the strut 40 will be described with reference to FIGS. 13A and 13B. Note that, the fold line 50 is not formed in the actual metal plate.

As illustrated in FIGS. 13A and 13B, each of the struts 40 before the processing is one metal plate. The metal plates are manufactured by punching, laser processing, or the like.

The first strut 40R and the second strut 40L are formed by folding the metal plates with front and rear sides opposed to each other by press processing, for example. More specifically, in a case where the first strut 40R is formed, the rear side surface 45 and the front side surface 47 are valley-folded on a paper surface of FIG. 13A to rise vertically so that the rear side surface 45 and the front side surface 47 are vertical with respect to the inner side surface 46. In a case where the second strut 40L is formed, the rear side surface 45 and the front side surface 47 are valley-folded on a paper surface of FIG. 13B to rise vertically. Next, each of the tongue pieces 49 provided in the upper and lower end parts of the rear side surface 45, the inner side surface 46, and the front side surface 47 of each of the metal plates is folded to a predetermined position. Then, the bottom surface 48 is valley-folded on the paper surface of FIGS. 13A and 13B to rise vertically. At this time, the tongue pieces 49 at the lower end of the metal plate are overlapped with the bottom surface 48 (refer to FIG. 9 and the like). Further, through the bottom insertion holes 42 of the bottom surface 48, for example, burring processing is applied to the tongue pieces 49 overlapped with the bottom surface 48 and screw holes are formed. Finally, a portion protruding from the bottom surface 48 illustrated in FIGS. 13A and 13B is folded in a lower direction to form the protrusion 43.

Note that, manufacturing procedure described above is an example and the present embodiment is not limited thereto. For example, the screw holes may be formed before folding the metal plate. A step of folding the tongue pieces 49 at the upper end of the strut 40 may be performed lastly. A step of folding the protrusion 43 does not need to be performed lastly and may be performed before that. As described above, the manufacturing procedure of the strut 40 is able to be changed as appropriate.

The tongue pieces 49 of the strut 40 are not essential components. In a case where no tongue piece 49 is provided, for example, the bottom insertion holes 42 may not be formed as simple holes but formed as screw holes so that the strut 40 and the base 30 are able to be connected.

Though description has been given by assuming that the number of the struts 40 is two in the present embodiment, the present embodiment is not limited thereto. The stand 20 may include another strut in addition to the first strut 40R and the second strut 40L.

As above, according to the present Embodiment 1, the struts 40 are formed by folding the metal plates, which have the same shape, in opposite directions with respect to front and back sides, so as to achieve column shapes having different shapes with the fold line directions as the longitudinal directions. Thereby, it is possible to suppress an increase in the number of steps because of providing two struts 40.

According to the present Embodiment 1, the bottom surface 48 of each of the struts 40 has the bottom insertion holes 42 at the asymmetrical positions with respect to the central axis. Thus, even when the strut 40 is to be connected to the base 30 with front and rear sides reversed, positions of the bottom insertion holes 42 do not match positions of the base-side insertion holes 32 and the screws 61 are not able to be inserted. Moreover, at a step of manufacturing the strut 40, since the bottom insertion holes 42 have been already formed before the metal plate is folded, it is not necessary to perform processing separately for the first strut 40R and the second strut 40L.

As a result, it is possible to prevent reversed installation of the strut 40 while suppressing an increase in the number of steps.

According to the present Embodiment 1, the strut 40 has the protrusion 43 and the base 30 has the through hole 33 corresponding thereto. Since the strut 40 is not able to be installed in the base 30 unless the protrusion 43 passes through the through hole 33, it is possible to prevent reversed installation of the strut 40.

Note that, though the present embodiment has a configuration in which the protrusion 43 is provided in the strut 40 and the through hole 33 is provided in the base 30, a configuration in which a through hole is provided in the strut 40 and a protrusion is provided in the base 30 may be used. In this case as well, the protrusion is able to pass through the through hole and an effect similar to that of the present embodiment is achieved.

According to the present Embodiment 1, the strut 40 has the cross section in the U-shape and has the upper end in which the notch 41 that extends along the edge on the opening side on the rear side surface 45 is provided. In the fixing metal fitting 70 that is a part of the display unit main body 10, the claw 71 is provided at the position corresponding to the notch 41. Even when the strut 40 is to be installed in the display unit main body 10 with the front and rear sides reversed, the notch 41 is not engaged with the claw 71, so that the strut 40 is not able to be installed. As a result, it is possible to prevent reversed installation of the strut 40.

As described above, according to the present Embodiment 1, the struts 40 are manufactured by folding the metal plates, which have the same shape, with the front and rear sides opposed to each other. In portions where each of the struts 40 is installed in the base 30 and the display unit main body 10, a structure to prevent reversed installation of the strut 40 is provided. Thereby, even when the stand 20 has the two struts 40, it is possible to prevent reversed installation while suppressing an increase in the number of steps.

According to the present Embodiment 1, the first strut 40R and the second strut 40L have shapes different from each other and portions (the recessed parts 31 and the fixing metal fittings 70) where the first strut 40R and the second strut 40L are installed in the base 30 and the display unit main body 10 have different shapes between the right and left sides accordingly. Thus, even when the first strut 40R and the second strut 40L are to be installed being replaced with each other, the first strut 40R and the second strut 40L are not able to be installed in the base 30 and the display unit main body 10. As a result, it is possible to prevent the first strut 40R and the second strut 40L from being installed being erroneously replaced with each other.

Embodiment 2

Figure 14:
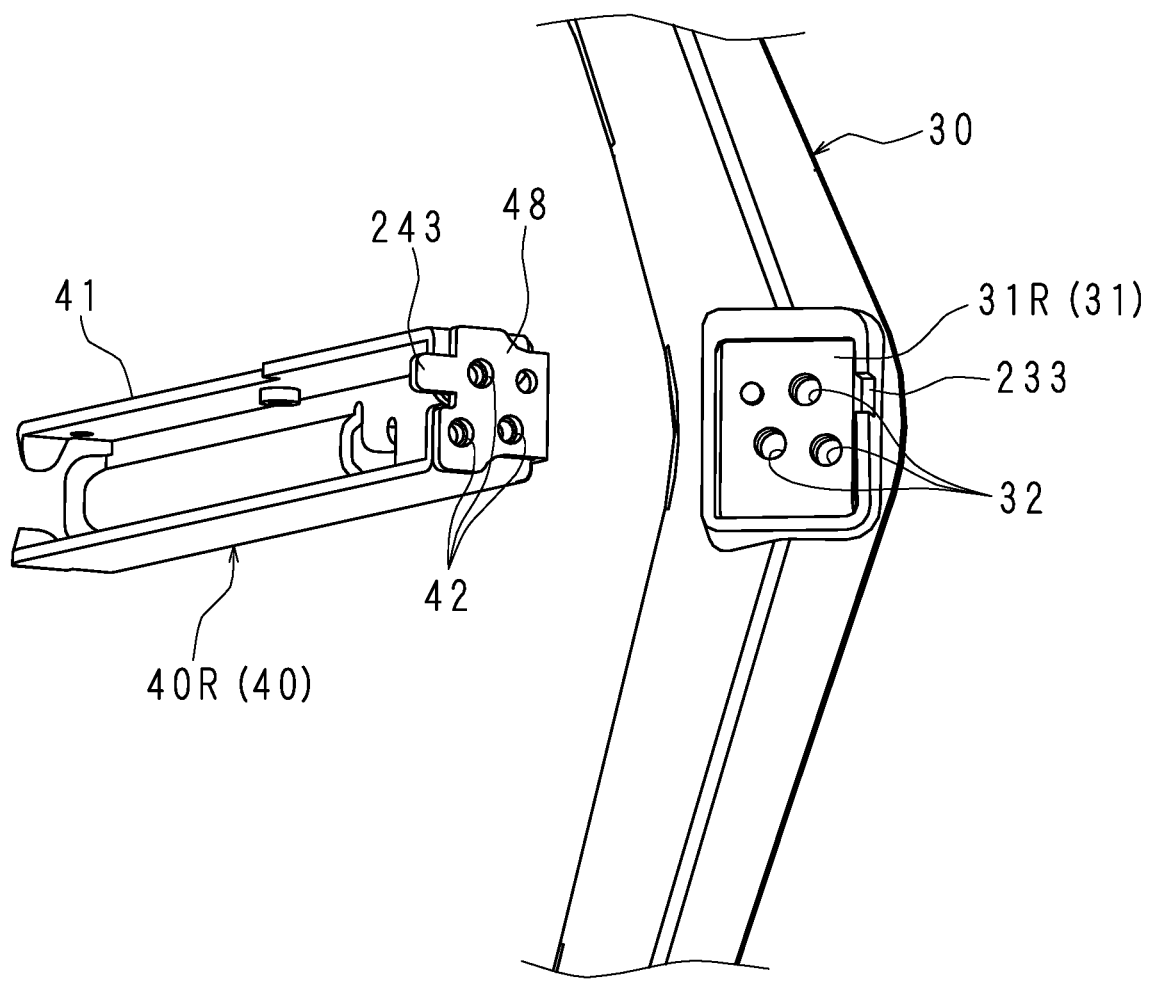
FIG. 14 is a partial enlarged view illustrating an installation structure of a base and a strut according to Embodiment 2.

FIG. 14 is a partial enlarged view illustrating an installation structure of the base 30 and the strut 40 according to Embodiment 2. FIG. 14 corresponds to FIG. 6 according to Embodiment 1. Hereinafter, content redundant with Embodiment 1 is given the same reference sign and description thereof is omitted.

In Embodiment 1, an aspect in which the protrusion 43 that protrudes in the lower direction is provided in the strut 40 and the through hole 33 corresponding thereto is provided in the base 30 in order to prevent reversed installation has been described. In the present embodiment, an aspect in which a protrusion 243 that is provided so as to protrude in a direction orthogonal to the longitudinal direction is provided in the strut 40 and a cut 233 corresponding thereto is provided in the base will be described.

As illustrated in FIG. 14, differently from the protrusion 43 according to Embodiment 1, the protrusion 243 according to the present embodiment is not provided so as to protrude in the longitudinal direction (the lower direction at the time of installation) of the first strut 40R, but is provided so as to protrude in a direction (the right direction at the time of installation) orthogonal to the longitudinal direction.

The first recessed part 31R does not include the through hole 33 according to Embodiment 1, but includes the cut 233 instead so as to correspond to the protrusion 243. The cut 233 is provided on a side surface of the first recessed part 31R that is a recessed in a rectangular shape and has a shape obtained in such a manner that a part of the side surface is cut in the rectangular shape. The not-illustrated second strut 40L and second recessed part 31L have similar configurations.

In a case where the lower end part of the strut 40 is inserted into the recessed part 31, the recessed part 31 does not receive the strut 40 unless the protrusion 243 and the cut 233 are fitted with each other.

As described in detail in Embodiment 1, the first strut 40R and the second strut 40L are manufactured by folding the metal plates, which have the same shape, in opposite directions with respect to the front and rear sides. Thus, bottom surfaces 48 are also folded with the front and rear sides opposed to each other, so that protrusion positions of protrusions 243 in the first strut 40R and the second strut 40L are bilaterally symmetrical to each other. As a result, the protrusions 243 and cuts 233 are not able to be fitted with each other unless the first strut 40R is allowed to be inserted into the first recessed part 31R and the second strut 40L is allowed to be inserted into the second recessed part 31L.

Thus, according to Embodiment 2, each of the struts 40 has the lower end part in which the protrusion 243 is provided so as to extend in the direction orthogonal to the longitudinal direction and the base 30 has the cut 233 provided at the position corresponding to the protrusion 243. The recessed part 31 is not able to receive the strut 40 unless the protrusion 243 and the cut 233 are fitted with each other, thus making it possible to prevent reversed installation of the strut 40.

According to Embodiment 2, the protrusion 243 does not need to be folded. Thus, it is possible to reduce the number of steps of processing the strut 40.

According to Embodiment 2, unless the first strut 40 R is allowed to be inserted into the first recessed part 31R and the second strut 40L is allowed to be inserted into the second recessed part 31L, the protrusions 243 and the cuts 233 are not able to be fitted with each other. As a result, it is possible to prevent the first strut 40R and the second strut 40L from being installed being erroneously replaced with each other.

Embodiment 3

Figure 15A:
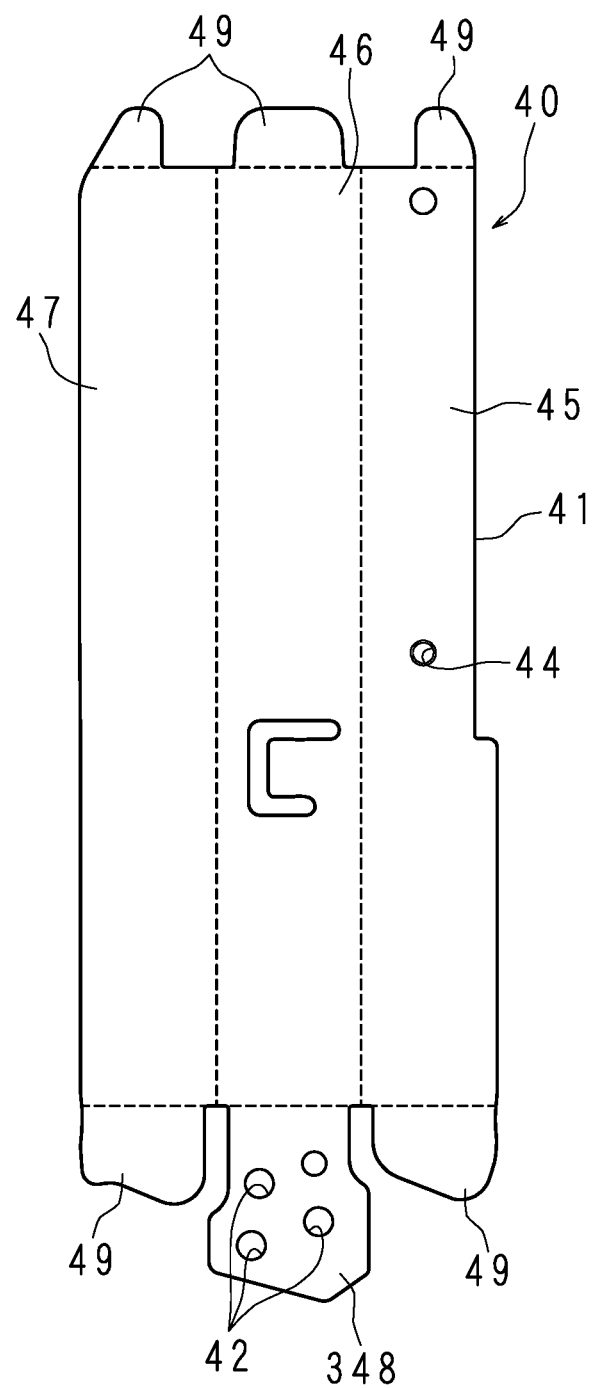
FIG. 15A is a development view of a strut according to Embodiment 3.
Figure 15B:
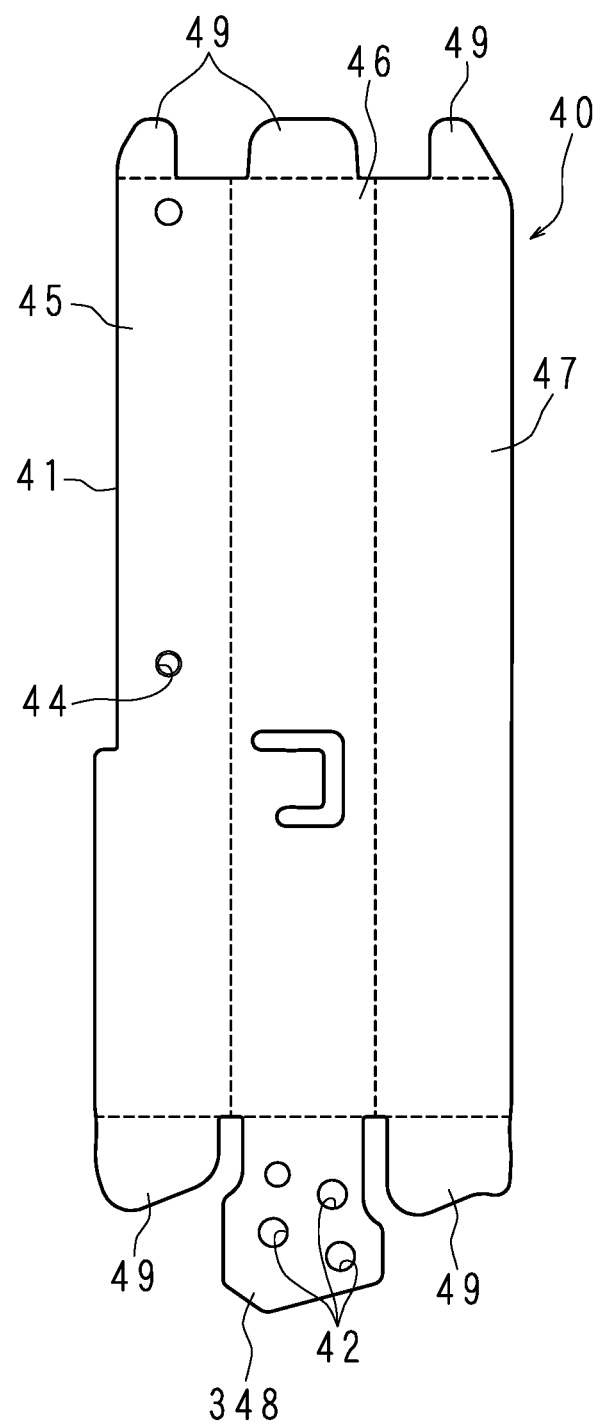
FIG. 15B is a development view of the strut according to Embodiment 3.
Figure 16:
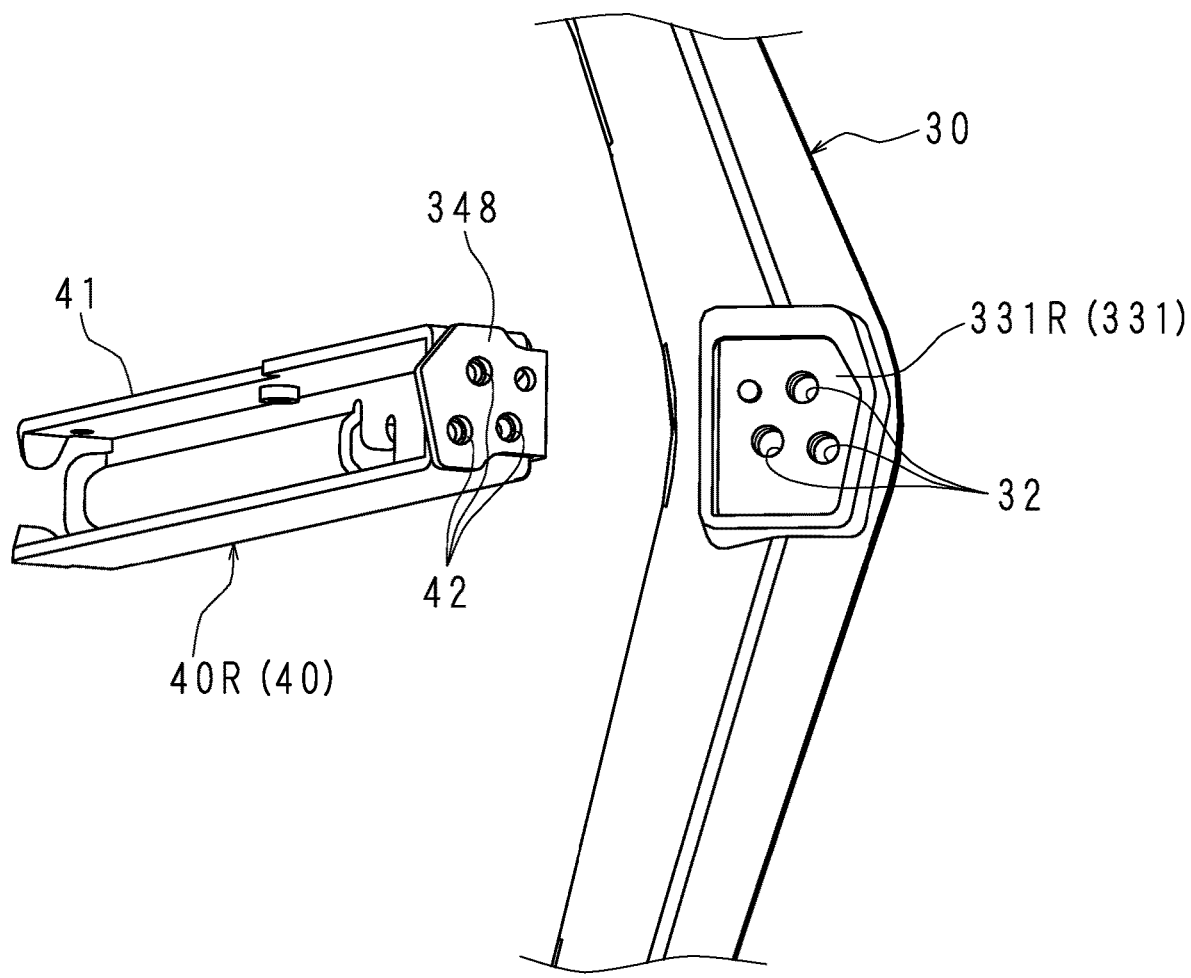
FIG. 16 is a partial enlarged view illustrating an installation structure of a base and a strut according to Embodiment 3.

FIGS. 15A and 15B are development views of the strut 40 according to Embodiment 3. FIG. 16 is a partial enlarged view illustrating an installation structure of the base 30 and the strut 40 according to Embodiment 3. FIGS. 15A and 15B illustrate a state of the metal plate before the strut 40 according to the present embodiment is subjected to folding processing. FIG. 16 corresponds to FIG. 6 according to Embodiment 1. Hereinafter, content redundant with Embodiment 1 is given the same reference sign and description thereof is omitted.

An aspect in which the bottom insertion holes 42, the protrusion. 43, and the like are formed in the strut 40 to thereby prevent reversed installation of the strut 40 has been described in Embodiment 1. In the present embodiment, an aspect in which a shape of a bottom surface 348 of the strut 40 is deformed to thereby prevent reversed installation will be described.

While the bottom surface 48 according to Embodiment 1 has the rectangular shape as illustrated in FIGS. 13A and 13B, the bottom surface 348 according to the present embodiment is formed into a pentagonal shape in which a side corresponding to an opening-side edge of the first strut 40R protrudes outward as illustrated in FIGS. 15A and 15B.

More specifically, the side protrudes in a triangular shape. In the triangular shape, two sides that are edges of the bottom surface 348 are preferably not isosceles in order to prevent the two struts 40 from being replaced. Moreover, as illustrated in FIG. 16, a shape of a first recessed part 331R is set as a pentagonal shape in a plan view correspondingly to the shape of the bottom surface 348. A second strut 40L and a second recessed part 331L which are not illustrated also have similar configurations.

Note that, the shape of the bottom surface 348 of the strut 40 according to the present embodiment is not limited to the pentagonal shape and may be a hexagonal shape or the like, for example.

Thus, according to Embodiment 3, both of the bottom surface 348 of the strut 40 and the recessed part 331 of the base 30 are formed into the pentagonal shape. Since the shape of bottom surface 348 of the strut 40 is the pentagonal shape, even when the strut 40 is to be connected to the base 30 with the front and rear sides reversed, the recessed part 331 is not able to receive the lower end part of the strut 40. As a result, it is possible to prevent reversed installation of the strut 40.

According to Embodiment 3, since the right and left struts 40 are formed by folding the same metal plates with the front and rear sides opposed to each other, it is only required that bottom surfaces 348 are formed into a pentagonal shape before folding processing and the bottom surfaces 348 are folded with the front and rear sides opposed to each other. As a result, it is possible to form the shape for preventing reversed installation while suppressing an increase in the number of steps.

According to Embodiment 3, two sides of the bottom surface 348, which are the opening-side edges of the strut 40, are not isosceles. Thus, shapes of the respective bottom surfaces 348 of the first strut 40R and the second strut 40L are pentagonal shapes different from each other. As a result, it is possible to prevent the first strut 40R and the second strut 40L from being installed being erroneously replaced with each other.

A display device (1) according to an aspect 1 of the present disclosure is a display device (1) that includes a display unit main body (10) that displays a video, two struts (40) each of which has one end installed in the display unit main body (10), and a base (30) on which both of the other ends of the two struts (40) are installed, and includes a reversed installation prevention unit that prevents the two struts (40) from being reversely installed in the display unit main body (10) and the base (30), in which the two struts (40) are formed by folding metal plates, which have the same shape, in opposite directions with respect to front and back sides and providing column shapes having different shapes with fold line directions as longitudinal directions.

According to an aspect of the present disclosure, even when the stand (20) has the two struts (40), it is possible to prevent reversed installation of the struts (40) while suppressing an increase in the number of steps.

In the display device (1) according to an aspect 2 of the present disclosure, each of the two struts (40) has the other end in which strut-side insertion holes (42) provided at asymmetrical positions with respect to a central axis are provided, the base (30) has base-side insertion holes (32), which are provided at positions corresponding to the strut-side insertion holes (42), at an installation part (31) of each of the two struts (40), and the reversed installation prevention unit is a connecting unit that connects the two struts (40) and the base (30) with screws (61) inserted into the strut-side insertion holes (42) and the base-side insertion holes (32).

According to an aspect of the present disclosure, it is possible to prevent reversed installation of the struts (40) and suppress an increase in the number of steps related to forming of the struts (40).

In the display device (1) according to an aspect 3 of the present disclosure, each of the two struts (40) has the other end in which a protrusion (43) or a through hole (33) is provided, the base (30) has a through hole (33) or a protrusion (43), each of which is provided at a position corresponding to the protrusion (43) or the through hole (33), at an installation part (31) of each of the two struts (40), and the reversed installation prevention unit is a passing unit in which the protrusion (43) passes through the through hole (33).

According to an aspect of the present disclosure, it is possible to prevent reversed installation of the struts (40).

In the display device (1) according to an aspect 4 of the present disclosure, each of the two struts (40) has a sectional shape in a U-shape and has the one end provided with a notch (41) that extends along one edge on an opening side of a cross section, the display unit main body (10) has a claw (71), which is provided at a position corresponding to the notch (41), at an installation part (70) of each of the two struts (40), and the reversed installation prevention unit is an engagement unit in which the notch (41) and the claw (71) are engaged.

According to an aspect of the present disclosure, it is possible to prevent reversed installation of the struts (40).

A television receiver according to an aspect 5 of the present disclosure includes: the display device (1) according to any one of the aspects; and a reception unit (2) that receives television broadcasting, in which the display device (1) is set to display a video on a basis of the television broadcasting received by the reception unit (2).

According to an aspect of the present disclosure, even when the stand (20) has the two struts (40), it is possible to prevent reversed installation of the struts (40) while suppressing an increase in the number of steps.

A method for manufacturing a strut (40) according to an aspect 6 of the present disclosure is a method for manufacturing a strut (40), by which two struts (40) that are installed in a display unit main body (10) of a display device (1) and have shapes different from each other are manufactured, and the method includes manufacturing two metal plates having the same shape, folding the two metal plates in opposite directions with respect to front and back sides, and forming the metal plates into column shapes having different shapes with fold line directions as longitudinal directions.

According to an aspect of the present disclosure, even when the stand (20) has the two struts (40), it is possible to prevent reversed installation of the struts (40) while suppressing an increase in the number of steps.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A display device that includes a display unit main body that displays a video, two struts each of which has one end installed in the display unit main body, and a base on which both of the other ends of the two struts are installed, wherein:

each of the two struts has the one end provided with a notch, the display unit main body has a claw, which is provided at a position corresponding to the notch, at each of two installation members corresponding to each of the two struts, the two struts are formed by folding metal plates, which have the same shape and are provided with the notches, in opposite directions with respect to front and back sides and providing column shapes having different shapes with fold line directions as longitudinal directions, each of the two installation members is a member having a cross section in a U-shape, which has a rectangular rear surface and a pair of side surfaces protruding from both long sides of the rear surface in a direction perpendicular to the rear surface, a plurality of the claws are provided on one long side of the rear surface, at positions symmetrical with respect to a midpoint of the one long side, an opening surface of the installation member faces a front side of the display device, and the two installation members are symmetrical to each other with respect to a direction along the long side.

2. The display device according to claim 1, wherein each of the two struts has the other end in which strut-side insertion holes provided at asymmetrical positions with respect to a central axis are provided, the base has base-side insertion holes, which are provided at positions corresponding to the strut-side insertion holes, at an installation member of each of the two struts, and the two struts and the base are connected with screws inserted into the strut-side insertion holes and the base-side insertion holes.

3. The display device according to claim 1, wherein each of the two struts has the other end in which a protrusion or a through hole is provided, the base has a through hole or a protrusion, each of which is provided at a position corresponding to the protrusion or the through hole, at an installation member of each of the two struts.

4. The display device according to claim 1, wherein each of the two struts has a sectional shape in a U-shape and has the one end provided with the notch that extends along one edge on an opening side of a cross section.

5. A television receiver comprising:

the display device according to claim 1; and a reception device that receives television broadcasting, wherein the display device is set to display a video on a basis of the television broadcasting received by the reception device.

* * * * *